Patented June 22, 1948

2,443,737

UNITED STATES PATENT OFFICE 2,443,737

COPOLYMER OF POLYALLYL ESTER AND UNSATURATED ALKYD RESIN

Edward L. Kropa, Old Greenwich, Conn., assignor to American Cyanamid Company, New York, N. Y., a corporation of Maine No Drawing. Application July 12, 1943, Serial No. 494,349

20 Claims. (Cl. 260—45.4)

This invention relates to resinous compositions and processes of producing such compositions by polymerizing or reacting a reactive resin of the alkyd type with reactive organic substances, generally solvents, to form substantially infusible, substantially insoluble resins.

One of the objects of this invention is to prepare improved resins and especially to obtain clear and colorless gels.

It is also an object of this invention to provide potentially polymerizable solutions which would be stable during storage.

Still another object of this invention is to control the rate of polymerization of the reactive mixture, as well as to improve the properties and characteristics of resulting gels.

Another object of this invention is to prepare compounds particularly suitable for use as coating compositions and as components in coating compositions.

A further object of the present invention is to prepare molding compositions and especially to prepare clear and colorless molded materials. Another object of this invention is to prepare laminated moldings having high strength and other desirable properties.

A still further object of this invention is to provide molding compositions suitable for injection molding. Other objects will be apparent from the description.

Substantially insoluble, substantially infusible resins may be prepared by means of the chemical reaction or polymerization of a mixture containing a resin possessing a plurality of polymerizably reactive alpha, beta enal groups (i. e.,

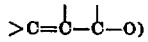

and an organic substance which contains the polymerizably reactive group $CH_2=CH—CH_2—$. The high boiling allyl compounds are the preferred reactive organic substances. Such mixtures may be utilized in coating compositions, in molding compositions, in laminating, in adhesives, in casting compositions, etc.

For the sake of brevity the organic substances which contain the polymerizable reactive group, $CH_2=C<$, will be referred to herein as "reactive materials" or as "reactive materials containing the $CH_2=C<$ group" and they are thus to be distinguished from the resins which possess a plurality of polymerizably reactive alpha, beta enal groups which are designated herein as "reactive resins" or as "unsaturated alkyd resins."

Many of the reactive materials containing the $CH_2=C<$ group are solvents and therefore the reactive resins may be dissolved therein to form liquid compositions which may be used as such without the addition of any other solvent unless particularly desirable. It is to be understood, however, that I am not restricted to liquid substances which actually act as solvents since in some cases the organic liquid substances may in fact act as a solute rather than as a solvent, it being dissolved by the resin, or a colloidal solution may be produced instead of a true solution. Furthermore, the reactive material may be a resin containing a plurality of $CH_2=C<$ groups or $CH_2=CH—CH_2—$ groups. Such a substance could be cured by a reactive resin or by a reactive substance which contains polymerizably reactive alpha, beta enal groups. Such substances may be derived from alpha, beta unsaturated organic acids, for example, by esterification of such acids.

Among the reactive resins used in the practice of this invention for interaction with the reactive material containing the $CH_2=C<$ group are those which are derived from alpha, beta unsaturated organic acids and, therefore, contain the reactive groupings present in these acids. The term "acids" as used herein is intended to include the anhydrides as well as the acid themselves since the former may be used instead of the acid. The term alpha, beta-unsaturated organic acid as used in the art does not include acids wherein the unsaturated group is part of an aromatic-acting radical, as for example, phthalic acid, and the same definition is adopted herein.

The resins are preferably produced by the esterification of an alpha, beta-unsaturated polycarboxylic acid with a polyhydric alcohol and particularly a glycol. Although esterification of the acid with a polyhydric alcohol is perhaps one of the simplest, most convenient ways of obtaining a reactive resin, I am not precluded from using resins otherwise derived from alpha, beta-unsaturated organic acids. Reactive resins suitable for my invention are any of those containing a plurality of polymerizably reactive alpha, beta enal groups.

PREPARATION OF THE POLYMERIZABLE MIXTURES

A reactive resin such as those prepared by the esterification of alpha, beta-unsaturated organic acids and a glycol or other polyhydric alcohol as illustrated above is mixed with the reactive material containing the group $CH_2=C<$. Upon adding a polymerization catalyst and subjecting the mixture to polymerization conditions such as, for example, heat, light or a combination of both, a substantially insoluble, substantially infusible resin is obtained.

All of the reactive substances suitable for use according to my invention for reaction with a reactive resin are characterized by the presence of the reactive group $CH_2=C<$ and none of them contain conjugated carbon-to-carbon double bonds. Compounds containing a conjugated system of carbon-to-carbon double bonds are known to react with themselves or with other unsaturated compounds such as the maleic esters, by a 1,2–1,4 addition mechanism such as that which has become generally known as the Diels-Alder reaction. On the other hand, compounds such as those used according to the present invention and which contain no conjugated carbon-to-carbon double bonds obviously cannot undergo this type of reaction with the maleic esters. Accordingly, my invention is not directed to the use of unsaturated compounds containing conjugated systems of carbon-to-carbon double bonds. Many substances which contain a carbon-to-carbon double bond conjugated with respect to oxygen are suitable for use according to my invention since they do not react with unsaturated alkyd resins in an undesirable manner, but, instead, copolymerize or interpolymerize to form substantially infusible, substantially insoluble resins.

The reactive allyl compounds which may be used are any of those compounds which contain the $CH_2=CH-CH_2-$ group and which do not have a boiling point below about 60° C. Of the allyl compounds which may be used the allyl esters form a large class all of which are suitable. The reactive allyl compounds which have been found to be most suitable are those having a high boiling point such as the diallyl esters, e. g., diallyl maleate, diallyl fumarate, diallyl phthalate and diallyl succinate. Other allyl compounds may also be used which are not necessarily high boiling. As pointed out in my copending application, Serial No. 487,034, filed May 14, 1943, substantially insoluble and substantially infusible resins may be prepared by reacting or polymerizing any of the following with a polymerizably reactive resin of the type described herein, i. e., unsaturated alkyd resins containing a plurality of alpha, beta enal groups: allyl alcohol, methallyl alcohol, allyl acetate, allyl lactate, the allyl ester of alpha-hydroxyisobutyric acid, allyl acrylate, allyl methacrylate, diallyl carbonate, diallyl malonate, diallyl oxalate, diallyl succinate, diallyl gluconate, diallyl methylgluconate, diallyl adipate, the diallyl ester of azelaic acid, diallyl sebacate, diallyl tartronate, diallyl tartrate, diallyl cilicone, diallyl silicate, diallyl fumarate, diallyl maleate, diallyl mesaconate, diallyl citraconate, diallyl glutaconate, the diallyl ester of muconic acid, diallyl itaconate, diallyl phthalate, the diallyl ester of endomethylene tetrahydrophthalic anhydride, triallyl tricarballylate, triallyl aconitate, triallyl citrate, triallyl phosphate, trimethallyl phosphate, the diallyl ester of ethylene glycol dicarbonate (i. e.,

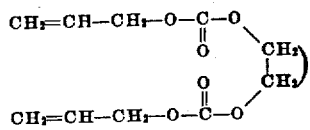

the diallyl ester of ethylene glycol dimalonate, the diallyl ester of ethylene glycol dioxalate, the diallyl ester of diethylene glycol dicarbonate, the diallyl ester of diethylene glycol dimalonate, the diallyl ester of diethylene glycol dioxalate, the diallyl ester of carbonic acid or of other dicarboxylic acid, diesters of other glycols, e. g., propylene glycol, the butylene glycols, triethylene glycol, etc., tetraallyl silicate and other tetraallyl esters.

Tetraallyl compounds are not easily prepared by direct esterification. One way for preparing such compounds is by the use of the acid chlorides.

Other allyl compounds which may be used for reaction with a polymerizable and unsaturated alkyd resin include reaction products of allyl malonate with formaldehyde or glyoxal, such compounds having the following formula respectively:

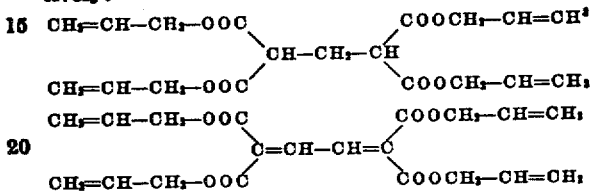

Another compound which may be employed is the tetraallyl ester obtained by the reaction of allyl malonate with chloroform in the presence of sodium allylate and which has the following formula:

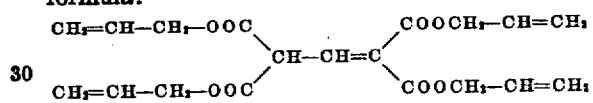

Still another compound which may be employed is the compound having the following formula:

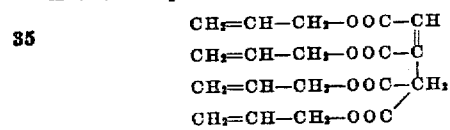

and it may be prepared by reacting allyl acetylene dicarboxylate with allyl malonate.

The polymerization catalysts include the organic superoxides, aldehydic and acidic peroxides. Among the preferred catalysts there are: the acidic peroxides, e. g., benzoyl peroxide, phthalic peroxide, succinic peroxide and benzoyl acetic peroxide; fatty oil acid peroxides, e. g., coconut oil acid peroxides, lauric peroxide, stearic peroxide and oleic peroxide; alcohol peroxides, e. g., tertiary butyl hydroperoxide usually called tertiary butyl peroxide and terpene oxides, e. g., ascaridole. Still other polymerization catalysts might be used in some instances such as soluble cobalt salts (particularly the linoleate and naphthenate), p-toluene sulfonic acid, aluminum chloride, stannic chloride and boron trifluoride.

The term polymerization catalyst as used in this specification is not intended to cover oxygen contained in the resin as an impurity. While this small amount of oxygen would only catalyze the reaction to a very small extent, in order to eliminate any ambiguity the term polymerization catalyst is specifically defined as excluding any oxygen present as an impurity in the resin itself.

The concentration of catalyst employed is usually small, i. e., for the preferred catalysts, from about 1 part catalyst per thousand parts of the reactive mixture to about 2 parts per hundred parts of the reactive mixture. If an inhibitor be present, up to 5% or even more of catalyst may be necessary according to the concentration of inhibitor. Where fillers are used which contain high concentrations of substances which act as inhibitors, e. g., wood flour, the concentration of catalyst necessary to effect polymerization may be well above 5%.

The polymerization conditions referred to are heat, light, or a combination of both. Ultraviolet light is more effective than ordinary light. The temperature of conversion depends somewhat on the boiling point of the reactive material and also on the pressures used. At atmospheric pressure, as in coating and casting operations, temperatures near or above the boiling point are unsuitable in most instances since substantial amounts of the reactive material would be lost by evaporation before the reaction between the resin and reactive material can be completed. Accordingly a temperature between room temperature (about 20–25° C.) and the boiling point is usually employed where polymerization of this nature is carried out. The rate of polymerization doubles for about each ten degrees (C.) rise in temperature for this reaction. A temperature is selected which will give a suitable reaction rate and yet not cause substantial volatilization. The following table shows the approximate polymerization temperatures most suitable for the named reactive materials.

| Reactive Material | Temperature Range | Preferred Temperature |
|---|---|---|
|  |  | ° C. |
| diallyl maleate | Room temp. to about 110° C. | 50 to 90. |
| diallyl phthalate | Room temp. to about 150° C. | 50 to 90. |

Obviously it will be necessary to use lower temperatures if large or very thick pieces are being cast because of the exothermic reaction and poor heat conductivity of the reacting mixture.

Where suitable precautions are taken to prevent evaporation of our reactive material or where pressure molding is used higher temperature than those mentioned above could be used. Since the time of curing is desirably much shorter (in pressure molding at elevated temperatures) and since the reactive material containing the $CH_2=C<$ group would not be lost so easily, a higher temperature is preferred.

The particular reactive resin, reactive material and catalyst is selected according to the type of product desired, taking into account the solubilities of the reactants as well as the character of the resulting gels. Some combinations of reactive resins and reactive materials result in opaque gels while others give clear products in the gel state. Obviously for many purposes the opaque gel may be used equally as well as the clear gel. The following examples (the proportions being given in parts by weight) illustrate these principles and indicate optimum control conditions, particularly in comparison with less suitable control conditions:

Example 1

10 parts of triallyl tricarballylate are mixed with 10 parts of diethylene glycol maleate resin and 0.4% benzoyl peroxide. The resulting reactive mixture is heated in the form of a small casting for about 40–60° C. for about 24 hours and then at about 100° C. for several hours. A hard, clear casting is obtained.

Example 2

10 parts of diallyl sebacate are mixed with 10 parts of a resin obtained by esterifying 1 mol of diethylene glycol with about 1 mol of a mixture including fumaric acid and sebacic acid, the molal ratio of fumaric acid to sebacic acid being about 4:1. About 0.2% of benzoyl peroxide is added to the resulting mixture. Films of the polymerizable mixture may be cured by baking at about 120° C. for from 1–4 hours or more. Clear, flexible films which are substantially infusible and substantially insoluble are obtained.

Example 3

Diethylene glycol maleate resin and diallyl maleate were mixed in various concentrations and treated with 0.4% of benzoyl peroxide. The following results were obtained after curing four days at 58° C.

| Resin | Diallyl Maleate | Result |
|---|---|---|
| Per cent | Per cent |  |
| 10 | 90 | Clear—soft. |
| 30 | 70 | Clear—semihard—gelled after 24 hours. |
| 50 | 50 | Do. |
| 70 | 30 | Do. |
| 90 | 10 | Do. |

Similar results are obtained substituting diallyl fumarate and diallyl phthalate.

Example 4

Ethylene glycol maleate resin (acid number 50) and diallyl phthalate were mixed in various concentrations and treated with 0.4% benzoyl peroxide. The mixtures were heated at 44° C. for twenty-four hours and then at 100° C. for three hours with the following results:

| Resin | Diallyl Phthalate | Results | |
|---|---|---|---|
|  |  | 24 hours | 27 hours |
| Per cent | Per cent |  |  |
| 0 | 100 | Liquid | Liquid. |
| 10 | 90 | Slightly opaque gel. | Slightly opaque gel. |
| 20 | 80 | do | Do. |
| 30 | 70 | do | Do. |
| 40 | 60 | do | Do. |
| 50 | 50 | Clear gel | Clear gel. |
| 60 | 40 | do | Do. |

Example 5

Similar results were obtained with diethylene glycol maleate resin (acid number 32) and ethylene glycol maleate resin (acid number 50) reacted with other diallyl esters:

| Resin | Parts of Resin | Solvent | Parts of Solvent | Results after 24 hours at 60° C. |
|---|---|---|---|---|
| Ethylene glycol maleate. | 10 | Diallyl succinate | 3.3 | Clear gel. |
| Do | 10 | do | 10.0 | Clear gel—blue. |
| Do | 10 | do | 15.0 | Do. |
| Diethylene glycol maleate. | 10 | Diallyl phthalate | 3.3 | Clear gel. |
| Do | 10 | do | 10.0 | Do. |
| Do | 10 | Diallyl succinate | 3.3 | Do. |
| Do | 10 | do | 10.0 | Do. |

Diallyl sebacate was found not to be appreciably soluble in ethylene glycol or diethylene glycol maleate resins but was soluble in long-chain glycol resins such as, for example, decamethylene glycol maleate resin.

Example 6

Ethylene glycol maleate resin (13 parts) was mixed with allyl or methallyl alcohol (7 parts) and 0.2% benzoyl peroxide. At 90° C. the mass gelled in eight to ten minutes.

Example 7

To a mixture of about 40 parts of diallyl phthalate and about 60 parts of ethylene glycol maleate resin (acid number 18), about 0.2% benzoyl peroxide was added. This was cast and cured in an oven at 150° C. A clear solid resin was obtained in four to five minutes.

Example 8

Approximately 250 parts of diallyl maleate were heated in a bath. The temperatures of the bath as well as the solution were recorded.

| Total Time Elapsed, Minutes | Temperature Diallyl maleate, °C. | Temperature Bath, °C. |
|---|---|---|
| 0 | 65 | 162 |
| 5 | 116 | 148 |
| 10 | 142 | 148 |
| 15 | 150* | 152 |
| 20 | 104 | 152 |
| 42 | 143 | 148 |
| 45 | 165 | 148 |

*As soon as the exothermic reaction was approached the material was removed from further contact with heat for approximately fifteen minutes and then further heated. The mass was then allowed to stand at room temperature and then distilled in vacuo. Approximately 60 parts of colorless viscous resin was obtained after the monomeric diallyl maleate had been removed.

2 parts of the resinous diallyl maleate were dissolved in 1 part of ethyl fumarate and treated with 0.2% of benzoyl peroxide. In approximately ten minutes at 90° C. a cloudy hard resin resulted.

The resinous diallyl maleate was mixed with equal parts of ethylene glycol maleate and treated with 0.5% of benzoyl perioxide. At 50° C. curing resulted in a hard clear resinous mass.

Other resinous substances containing a plurality of unsaturated groups such as allyl cellulose, methallyl cellulose, crotyl cellulose, etc. could be treated in a similar manner with reactive materials or with reactive resins.

Example 9

500 parts of phthalic anhydride, 103 parts of ethylene glycol, 225 parts of allyl alcohol, 225 parts of toluene and 3.4 parts of p-toluene sulfonic acid were heated in such a manner that the hot vapors passed through a bubble-cap fractionating column before condensing. The water was separated and the other components returned to the still. The heating was continued for approximately sixteen hours. The mass was then heated in a low vacuum to remove the low boiling constituents and then in a higher vacuum (4 mm.). The bath around the flash was maintained at approximately 180° C. for 2.5 hours to remove volatile materials.

The residue remaining was a soft fluid viscous resin of acid number of 38.

One part of the above resin was mixed hot with 1 part of alphapropylene glycol maleate resin and treated with 0.2 part of benzoyl peroxide. At 120° C. rapid curing was obtained.

Example 10

Equal parts of diethylene glycol maleate resin (acid number 32) and diallyl maleate were mixed with 0.02% cobalt naphthenate and 0.2% benzoyl peroxide. At 100° C. films of this composition on glass dried to very hard brittle coatings in ten minutes. One hour at 90° C. was required to obtain similar coatings in ten minutes. One hour at 90° C. was required to obtain similar coatings when diallyl succinate was substituted for the diallyl maleate.

Example 11

A resin formed by the reaction of 1 mol of triethylene glycol with 1 mol of a mixture containing fumaric acid (25%) and phthalic anhydride (75%) was mixed with ethylene glycol maleate resin in various proportions. 60 parts of these mixed resins were mixed with 40 parts of a diallyl ester, 0.05 part of cobalt naphthenate in toluol and 0.2 part of benzoyl peroxide in dioxan. The following results were obtained:

| Triethylene Glycol Phthalic-Fumaric Resin | Ethylene Glycol Maleate | Diallyl Maleate | Result at 90° C. at— | |
|---|---|---|---|---|
| | | | 11 min. | 20 min. |
| Parts | Parts | Parts | | |
| 60 | 0 | 40 | Tack-free | Dry. |
| 30 | 30 | 40 | do | Do. |
| 10 | 50 | 40 | Tacky | Do. |

Example 12

Compositions similar to those of Example 11 were made using the same proportions of diallyl maleate resin and catalyst. The following results at 90° C. were obtained with the resins indicated, the proportions being given in mol %:

| Resin | Drying time |
|---|---|
| 50% Triethylene glycol, 12.5% Fumaric, 37.5% Phthalic | Minutes 12 |
| 50% Triethylene glycol, 25% Fumaric, 25% Phthalic | 12 |
| 50% Triethylene glycol, 40% Fumaric, 16% Phthalic | 12 |
| 50% Triethylene glycol, 25% Fumaric, 25% Pinenefumaric (Made by reacting ½ mol of pinene to 1 mol of fumaric) | 20 |

Example 13

60 parts diallyl maleate were mixed with 40 parts of diethylene glycol phthalic-maleic resin (50% phthalic-50%maleic). Films of this mixture dried from the bottom but the top remained soft. The addition of linseed fatty acids to the resin, however, eliminated this tack.

For coating compositions too large a proportion of maleic acid in the resin should not be used if best adhesion and pliability is desired. To eliminate the slight amount of surface tack, the alkyd resin may be modified with a small amount of drying oil acids. Drying oils containing a number of unsaturated linkages should be used. The alkyd resin should preferably contain a certain number of oxygen bridges to get good surface drying.

Example 14

Phthalic anhydride (150 parts), triethylene glycol (160 parts) and linseed oil (15 parts) were heated in an atmosphere of $CO_2$ at 180° C. for eight hours, resulting in an acid number of 31.8. To the cooled mix there was added maleic anhydride (98 parts) and ethylene glycol (70 parts) and the mixture then heated eight hours at 175° C. under $CO_2$. During the last fifteen minutes the gas was blown through quite vigorously to remove the volatile ingredients. After further heating at 150° C. for five hours a resin of acid number 20.3 was obtained.

This resin was dissolved in diallyl maleate in the ratio 60:40, respectively. 0.05% cobalt drier and 0.1% of mercaptobenzothiozole were added. Films of this dried on tin at 90° C. in fifteen to twenty minutes. They were hard and resistant.

Example 15

46 parts of glycerol, 49 parts of maleic anhydride, 35 parts of linseed oil acids and 69 parts of undecylenic acid were heated to 180 C. during about three hours. Compatibility did not occur and the mass gelled. Upon the slow addition of the linseed oil acids to the hot mixture of the other ingredients compatibility was established. The resin (12 parts) resulting from this reaction was dissolved separately in diallyl maleate (8 parts) and also in toluene (8 parts) and treated with 0.5% benzoyl peroxide and 0.05% cobalt naphthenate and baked at 90° C. The resin-diallyl maleate mixture dried in less than an hour whereas the resin-toluene mixture required one and one-half hours to dry.

Obviously the mixture containing the reactive resin and reactive material containing the $CH_2=C<$ group can be mixed with lacquer ingredients and solvents such as cellulose derivatives. The following example illustrates such a coating composition:

Example 16

A resin was prepared by the esterification of 2 mols of diethylene glycol, 1 mol of maleic anhydride, 1 mol of phthalic anhydride, 5% (of the total of the foregoing ingredients) of linseed oil acids and glycerine in an amount equivalent to the linseed fatty acids. A mixture of 60 parts of resin and 40 parts of diallyl maleate was treated with 0.05% cobalt naphthenate.

Another solution was also made up of the following composition:

| | Per cent |
|---|---|
| Nitrocellulose | 29.2 |
| Ethanol | 12.5 |
| Ethyl acetate | 58.3 |

One part of each of the above solutions was mixed with one part of toluene and the mixture applied to tin. The film was baked for forty-five minutes at 90° C. to yield a clear, glossy, hard film.

The following examples show molding compositions and shaped or molded articles comprising my polymerizable reactive mixtures:

Example 17

To 125 parts of cellulose filler (Novacel) about 22 parts of diallyl phthalate containing about 0.1–0.2 part of benzoyl peroxide are added and the resulting composition is placed in a suitable mixer, e. g., a Banbury mixer, and agitated until homogenized. About 45 parts of the solution containing 75% of ethylene glycol maleate and 25% of diallyl phthalate are added and the entire mixture is ground for about 35 minutes.

The resulting product is molded at temperatures of about 130–150° C. and at pressures up to about 3000 pounds per square inch. Small dish-like moldings are produced at this temperature and pressure in about 3 minutes.

Example 18

| | Parts |
|---|---|
| Ethylene glycol maleate resin | 50 |
| Diallyl phthalate | 50 |
| Benzoyl peroxide | 0.05 |
| t-Butyl peroxide | 0.4–0.5 |

This composition may be ground if necessary to disperse the benzoyl peroxide thoroughly. The mixture is molded in polished molds for about 3 minutes at about 130° C. and at approximately 200 pounds per square inch pressure. A clear, light-colored homogeneous molding is obtained.

The pressure may be varied considerably and satisfactory moldings have been made at pressures as low as 150 pounds per square inch at about 130–140° C. This composition is also suitable for injection molding and in this instance, the liquid composition described above is forced into a hot mold.

Example 19

| | Parts |
|---|---|
| Resin "E" | 60 |
| Diallyl phthalate | 40 |
| Benzoyl peroxide | 0.5 |

Resin "E" is dissolved in the diallyl phthalate and the benzoyl peroxide is added. The above solution is coated onto glass fabric and placed between smooth platens. A pressure of about 10–15 pounds/sq. in. is applied to the platens, in order to remove entrapped air. The assembly is then heated at about 150° C. for about 2 hours. The platens are removed and a stiff sheet results.

Using 2 plys of glass cloth, possessing the trade name "EC-11-161" (sold by Owens-Corning Fiberglas Corporation), the following physical properties were obtained using the above resinous composition:

Tensile strength (+25° C.):

32,000 pounds/sq. in.
27,100 pounds/sq. in.

The difference in strength was obtained by cutting specimens parallel to and at right angles to the warp.

The modulus in bending values were:

$9.6 \times 10^5$ pounds/sq. in. at $-40°$ C.
$6.1 \times 10^5$ pounds/sq. in. at $-40°$ C.
$9.6 \times 10^5$ pounds/sq. in. at $+25°$ C.
$7.3 \times 10^5$ pounds/sq. in. at $+25°$ C.

Here again tests were conducted parallel to and at right angles to the warp.

The above liquid composition may be applied by means of a doctor blade, by dipping, followed by squeeze rolls, by spray or by brush.

Resin "E" above was prepared by heating 6 mols of diethylene glycol, 5 mols of fumaric acid and 1 mol of sebacic acid at about 200° C. until an acid number of about 50 was obtained.

Example 20

| | Parts |
|---|---|
| Diethylene glycol fumarate | 50 |
| Diallyl phthalate | 50 |
| Lauroyl peroxide | 0.5 |

The above composition is cast between sheets of glass. A paper spacer of approximately 30 mils is used to separate the glass sheets. The resin is forced into this space by means of a hypodermic needle. The assembly is maintained for about 1 hour at 150° C. The assembly is cooled and placed in cold water. A thin, flexible, hard sheet of resin resulted. The composition is especially transparent since both sides of the sheet had taken the surface from the glass.

Such sheets of resin may be used directly or may be sealed onto other surfaces and used as a coating. When such materials are to be used as coatings, it is preferable to abrade one surface. This may be accomplished mechanically or in the manufacture thereof by the use of etched glass as one casting surface in the above assembly.

Example 21

A thin, flexible sheet may be prepared by using a formulation such as follows in the process outlined in Example 20.

| | Parts |
|---|---|
| Resin "F" | 50 |
| Diallyl phthalate | 50 |
| Benzoyl peroxide | 1 |

Resin "F" is prepared by heating 2 mols of sebacic acid, 1 mole fumaric acid and 3 mols of ethylene glycol at about 200° C. until the acid number is about 50.

A flexible sheet is formed which is similar to that obtained in Example 20.

Example 22

In order to produce compound curved laminated forms, the following procedure has been found satisfactory: Canvas or glass cloth cut to size is impregnated with the reactive mixture employed in Example 19. The layers of impregnated resin are placed in an appropriate form and a vacuum applied, suitably with a rubber bag. The assembly is then heated for approximately 5 hours at 110° C.

Example 23

| | Parts |
|---|---|
| Diallyl phthalate | 48 |
| Ethylene glycol maleate resin | 32 |
| Toluene | 10 |
| Ethanol | 10 |
| Benzoyl peroxide | 0.6 |
| t-Butyl peroxide | 0.4 |

Canvas is impregnated with the above solution and the excess, if any, is removed by passing the impregnated canvas through squeeze rolls.

The impregnated canvas is then placed in an oven at about 80° C. until the resin has been partially converted to the infusible, insoluble stage. This operation requires approximately 2–3 hours. The impregnated canvas should be molded immediately or if allowed to stand for any time, precautions should be taken to avoid exposure to air or oxygen.

The sheets of impregnated canvas are cut, stacked and molded under heat and pressure at about 2000–3000 pounds per square inch and at a temperatures around 125° C. for approximately 4 fours, thereby producing a laminated cloth plate of very high transverse strength.

Alternatively, cut canvas sheets may be impregnated with the above composition without the use of the volatile solvents, alcohol and toluene.

The solution of diallyl phthalate and alkyd resin is applied to canvas using equal weights of canvas and reactive composition. The assembled sheets are placed between platens and placed in a press. A pressure of about 50 pounds/sq. in. is applied and the mass cured at 150° C. for 1.5 hours. A stiff cured resinous material results. Paper may be impregnated in a similar manner. For example, a composition containing approximately 45–50% resin has a transverse strength of about 16,000–19,000 pounds/sq. in. This laminated plate is particularly suitable for use in production of gear wheels because of the high transverse strength and since it may be machined easily.

Example 24

| | Parts |
|---|---|
| Ethylene glycol maleate resin | 60 |
| Diallyl maleate | 40 |
| Benzoyl peroxide | 0.7 |
| Cobalt naphthenate | 0.04 |

This mixture is used to impregnate canvas and the impregnated canvas is heated at about 80° C. for around 30–35 minutes in an oven. The material is then cut, stacked and molded at a pressure of about 2500–3000 pounds/sq. in. at a temperature of about 125° C. and for approximately 3 hours. The molded plate thus produced has a transverse strength of about 17,000 pounds/sq. in. and it contains about 40 per cent resin. The strength may be increased and the electrical properties may be improved somewhat by curing the resin at lower temperatures, e. g., 105° C. and at ordinary atmospheric pressures. This, of course, requires a correspondingly longer time for the conversion to the infusible, insoluble stage.

Example 25

| | Parts |
|---|---|
| Resin "G" | 50 |
| Diallyl maleate | 50 |
| Benzoyl peroxide | 7 |

This composition is applied to paper on a tube rolling machine, the machine comprising suitable rollers for paper and a means for distributing a uniform coating of resin on the paper. After the resin-impregnated paper has been rolled, the roll is cut, stacked and partially cured (i. e., polymerized) at about 110° C. and then molded at somewhat higher temperature, e. g., 120–130° C. at a pressure of about 2000 pounds/sq. in. The resulting molded plate has good electrical properties and it has excellent transverse strength. If desired, cylindrical moldings can be produced by suitable modification of the apparatus and process.

Resin "G" is prepared by heating at about 180° C. under an inert atmosphere 650 parts of phthalic anhydride, 420 parts of maleic anhydride, 800 parts of triethylene glycol, 410 parts of ethylene glycol and 180 parts of linseed oil fatty acids in a suitable reaction chamber provided with a reflux condenser which has a water trap to separate the water formed during the esterification from the condensate. The mixture is heated for about 4–12 hours or until a relatively low acid number is obtained, e. g., about 20.

VISCOSITY ADJUSTMENT OF REACTIVE MIXTURE

It is sometimes desirable to reduce the viscosity of our mixtures of reactive resin and reactive material containing the $CH_2=C<$ group, as, for instance, when a very viscous resin is to be used for coating. It is possible to do this by adding an esterification catalyst, e. g., p-toluene sulfonic acid and then heating until the viscosity goes down. The mechanism of this change is probably reesterification. This is also useful when the composition is to be baked at high temperature, under which conditions the reactive material would be lost in part by evaporation. If this "thinning" process is carried out, the reactive material is combined with the resin by reesterification and is not lost. It is also desirable to add a polymerization inhibitor before the heating or "thinning" process.

Example 26

A resin made by esterification at 150° C. of 294 parts of maleic anhydride, 121 parts sebacic acid, 227 parts of ethylene glycol, 32 parts of linseed fatty acids and 3.6 parts of p-toluene sulfonic acid was mixed with diallyl maleate in the ratio of 80 parts of resin and 40 parts of diallyl maleate, 0.01% p-toluene sulfonic acid added, and the mixture heated in an oil bath at 90° C. for five hours. The viscosity decreased from 10 to 8 poises.

In casting or molding operations using a mixture of a reactive resin and reactive material containing the $CH_2=C<$ group, it may sometimes be desirable to body the reactive mixture before adding the catalyst in order to cut down the induction period which would otherwise be too long. This may be done by heating a mixture of resin and reactive material from about 70° C. to about 110° C., preferably at about 90° C., for sufficient length of time to substantially reduce the induction period. This time will vary with each resin-reactive material combination with the initial viscosity and other such factors but may be determined by observation of the rise of viscosity. The heating should continue until the viscosity begins to rise rapidly. A general rule for determining the heating time is to heat the mixture until the viscosity is about two to three times the initial viscosity.

After the bodying operation is carried out, the polymerization catalyst is added to the mixture and the whole subjected to polymerization conditions. The use of liquid peroxides instead of solid peroxides is an advantage after bodying the resin mixture since it is difficult to get the solid peroxides dissolved rapidly enough. Peroxides of the coconut oil acids, tertiary butyl peroxide and ascaridole are suitable liquids.

By the use of this process the induction period is cut down from approximately ½ to ⅛ the time that is required when the bodying process is not used. Even greater reductions are obtained with some mixtures.

In bodying reactive mixtures containing the reactive resin and a reactive material containing the $CH_2=C<$ group wherein the proportion of reactive material is greater than about 30%, the viscosity rise is so sudden that it may be somewhat difficult to control it. Accordingly, if it is desired to body a resin-reactive material mixture containing more than 30% of reactive material, an alternative procedure is used. By this method one first bodies a mixture containing only 30% of reactive material. Then a small portion of additional reactive material is added, for example, sufficient to make the reactive material concentration 40% and then this is bodied. If still more reactive material is desired, another small portion of reactive material is added and the bodying process repeated. This process is repeated until the desired concentration and viscosity is obtained.

ADDITION OF INHIBITORS

One of the difficulties in the use of the compositions described above is that they are not susceptible to storage in the mixed form because polymerization will usually take place even at room temperature within a comparatively short time. Moreover, when it is desired to cure the compositions very rapidly under heat and pressure, the reaction becomes at times so vigorous that it cannot be controlled. In order to overcome these difficulties it has been found advisable to incorporate a small proportion of a polymerization inhibitor in the mixture of resin and reactive material. When it is desired to use this mixture, a small percentage of the polymerization catalyst is added, sufficient to overcome the effect of the inhibitor as well as to promote the polymerization. By careful control of the concentrations of inhibitor and catalyst, a uniform product is obtainable with a good reaction velocity. Upon subjection of this mixture to polymerization conditions such as heat, light or a combination of both, and with or without pressure, an infusible, insoluble resin is produced which has many more desirable characteristics than the resins produced by the polymerization of mixtures not containing the polymerization inhibitor such as, for instance, the lack of fractures.

Suitable polymerization inhibitors for this reaction are phenolic compounds especially the polyhydric phenols and aromatic amines. Specific examples of this group of inhibitors are hydroquinone, benzaldehyde, ascorbic acid, iso-ascorbic acid, resorcinol, tannin, sym. di, beta naphthyl p-phenylene diamine and phenolic resins. Sulfur compounds are also suitable.

The concentration of inhibitor is preferably low and I have found that less than about 1% is usually sufficient. However, with the preferred inhibitors I prefer to use only about 0.01% to about 0.1%.

The inhibitor may be incorporated in the reactive resin-reactive material combination (either before or after bodying) or it may be added to the original reactive resin before or during the esterification of the said reactive resin. By adding the inhibitor before the esterification it is sometimes possible to use an inhibitor which would otherwise be substantially insoluble in the reactive resin-reactive material composition. By adding the inhibitor to the unesterified mixture the inhibitor may become bound into the resin upon subsequent esterification.

Example 27

Resins were made up of the following compositions by esterification for the same length of time at 170° C.:

| Ingredients | Resin No. 1 | Resin No. 2 |
|---|---|---|
| Maleic Anhydride | 49 | 49 |
| Ethylene Glycol | 41 | 41 |
| Benzaldehyde |  | .5 |

Resin No. 2 was slightly yellower but had a lower viscosity than resin No. 1.

These resins were mixed with equal parts of diallyl maleate. The viscosity of the diallyl maleate solutions of resin No. 1 and resin No. 2 was 4.0 poises and 3.0 poises, respectively. Each of these solutions gelled when treated with 0.2% benzoyl peroxide and subjected to heat, even though resin No. 2 contained a polymerization inhibitor while resin No. 1 did not contain an inhibitor.

REACTIVE RESINS AND THEIR PREPARATION

Reactive resins suitable for polymerization with reactive materials containing the $CH_2=C<$ group in accordance with the teachings of our invention are those which contain a plurality of alpha, beta enal groups. The simplest members of this group are those produced by the esterification of an alpha, beta-unsaturated organic acid with a polyhydric alcohol.

The preferred polyhydric alcohols are those which contain only primary hydroxyl groups since the presence of secondary hydroxyl groups may make it difficult to obtain rapid esterification. The glycols are generally preferable. If colorless resins be desired or if optimum electrical properties be desired, it is preferable to use glycols which do not have any oxygen bridges in their structure since the presence of oxygen linkages may lead to the formation of color bodies during the preparation of the resin. By the use of glycols which do not contain the oxygen bridges clear colorless resins may be produced. On the other hand, oxygen bridges may be desirable if the resin is to be used in coating as they cause films to dry faster.

The particular choice of glycol or other polyhydric alcohol used in preparing the resin is governed mainly by the physical properties desired of the intermediate and final polymerization products, especially hardness, impact resistance, distensibility, refractive index, adhesion, compatibility relationships, etc., including also solvent, water alkali, acid or chemical resistance in general.

The alpha, beta unsaturated organic acids which I prefer to use in preparing the reactive resins include maleic, fumaric, itaconic and citraconic although other similar acids could be substituted such as mesaconic acid, aconitic acid and halogenated maleic acids such as chlormaleic acid and any of the foregoing could be substituted in part with acrylic, beta benzoyl acrylic, methacrylic, $\Delta^1$-cyclohexene carboxylic, cinnamic, and crotonic acids. Obviously, various mixtures of these acids can be used where expedient.

The reactive resins may be modified with other substances which are used in alkyd resins, i. e., monohydric alcohols, monobasic acids or dibasic acids, e. g., phthalic acid, succinic acid, glutaric acid, adipic acid, azelaic acid, sebacic acid, etc., which do not contain groups polymerizably reactive with respect to organic substances containing $CH_2=C<$ groups. These modifying agents are usually used as diluents or plasticizers, chemically combined in the resin. The use of a small proportion of the saturated dibasic acids generally improves the mechanical properties of the resins after copolymerization with the material containing the $CH_2=C<$ group.

The reactive resins may be prepared from polyhydric alcohols other than the glycols or from mixtures including a glycol and a higher polyhydric alcohol. Examples of these are glycerol, pentaerythritol, etc. Polyhydric alcohols containing more than two hydroxyl groups react very readily with the alpha, beta unsaturated organic acids. Consequently it may be preferable to use some monohydric alcohol in conjunction with the alcohols which contain more than two hydroxyl groups or else some monobasic acid may be used.

It is also possible to introduce initially into the resin structure a certain number of groupings of the type $CH_2=C<$ through the use of unsaturated alkyl compounds. One way of accomplishing this, for example is by direct esterification of an unsaturated alcohol containing a $CH_2=C<$ group. Examples of such alcohols are allyl alcohol and methallyl alcohol.

While the reactive resins may be modified in the same general manner as other alkyd resins, it is preferable to have at least 20% polyhydric alcohol in the reactive mixture and at least 25% polybasic acid in said reactive mixture. If a monohydric alcohol or a dibasic acid which does not contain polymerizable active groups with respect to organic substances containing the $CH_2=C<$ groups be used, the proportion of such substances will depend on the properties required of the polymerized reactive material-reactive resin mixture. By the use of a relatively large proportion of a polymerizably active dibasic acid, e. g., maleic, in the reactive resin, a hard, tough polymer is produced upon subsequent reaction of said reactive resin with a reactive material containing the $CH_2=C<$ group. On the other hand, if the reactive resin is obtained from a relatively small proportion of polymerizably active dibasic acid and a relatively large proportion of acids which do not contain groups polymerizably active with respect to organic substances containing $CH_2=C<$ groups, a softer and more rubbery resin results upon polymerization with a reactive material containing the $CH_2=C<$ group. The same effect is produced by the introduction of other inactive ingredients. By varying the ingredients and the proportions of the ingredients, resins may be obtained having properties desirable for almost any particular use.

The unsaturated alkyd resins employed in accordance with my invention are preferably those having an acid number not greater than 50 although in some cases resins having an acid number as high as 100 may be desirable. Generally, the acid number should be as low as possible, but this is sometimes controlled by practical considerations of operation such as time, temperature and economy.

The resins should be so formulated that the carboxyl groups of the acids are reacted with the theoretical molal equivalent of the hydroxyl groups of the alcohols. In this connection it is to be noted that the hydroxyl groups of modifying alcohols as well as the carboxyl groups of modifying acids should be included with the hydroxyl groups and carboxyl groups of the principal reactants, the polyhydric alcohol and the alpha, beta unsaturated polycarboxylic acid, respectively.

If it be desirable to introduce lower alkyl groups into the resin, this may be done by using maleic esters of monohydric alcohols, e. g., ethyl maleate. The alkyl ester will then be united with the resin by polymerization. This could not be accomplished with the saturated type of alkyd, e. g., phthalic acid esters of polyhydric alcohols.

Resins which contain a plurality of alpha, beta enal groups are sensitive to light, heat and polymerizing catalysts. Since oxygen tends to cause these resins to polymerize, it is desirable that the resins should be made in the absence of this substance, especially when colorless resins are required. The exclusion of oxygen and polymerizing catalysts is desirable during the preparation of the resin and the presence of dissolved oxygen in the original reactants is also preferably avoided. Moreover, dust and extraneous particles that reagents may pick up usually should be removed, especially if colorless resins are desired. One manner in which the dissolved gases and other extraneous impurities may be removed is through the distillation of the ingredients into the reaction chamber in the absence of air.

In order to keep oxygen from contact with the reactants an inert gas such as carbon dioxide or nitrogen may be introduced into the reaction chamber. This may be done either by merely passing the gas over the surface or by bubbling the gas through the liquid reactants. In the latter instance it may be made to perform the added function of agitating the mixture thus eliminating the necessity for mechanical agitation. The inert gas will also carry away at least part of the water formed and toward the end of the reaction it can be used to carry away the reactants still remaining unreacted. Upon separation of the water vapor the used carbon dioxide or other inert gas would be particularly suitable for making high grade colorless resins since any residual reactive impurities such as oxygen would have been removed in its passage through the first batch of resin reactants.

The effect of light is not so important if the reactants are purified and the reaction carried on in an inert atmosphere as outlined above. However, as an added precaution the esterification may be conducted in the dark. It is also advisable to avoid local overheating and discoloration is minimized if the reaction is conducted below a temperature of about 200° C. To avoid overheating it is advisable to raise the temperature slowly at the beginning, especially if an anhydride be used since the reaction between an anhydride and an alcohol is exothermic.

The preparation of the reactive resins is illustrated in the following examples, the reactants being given in parts by weight.

PREPARATION OF RESIN "A"

98 parts of freshly distilled maleic anhydride were reacted with about 10% in excess of equimolecular proportions of freshly distilled ethylene glycol (68 parts) at about 170–175° C. An excess of ethylene glycol is preferred because of its high volatility. The mixture is continuously agitated and carbon dioxide is introduced into the reaction chamber during the reaction thereby blanketing the surface of the reactants. After eight to twelve hours a clear, water-white resin is produced with an acid number of 35–50.

PREPARATION OF RESIN "B"

Diethylene glycol (106 parts) and maleic anhydride (98 parts) were separately vacuum distilled into a reaction chamber which had been used in previous preparations, and the mixture was stirred mechanically while carbon dioxide gas was introduced over the surface of the resin to exclude air and to remove water that was formed in the esterification. The reaction was conducted at 170° C. for a period of from eight to twelve hours yielding a resin of acid number of 35–50.

PREPARATION OF RESIN "C"

1200 parts of maleic anhydride were mixed with 1023 parts of alpha propylene glycol (equivalent to one mol of each plus approximately 10% of the glycol). This mixture was heated with agitation in an inert atmosphere at 150–165° C. After about four hours the resin turned opaque on cooling. After about eleven hours heating, a resin is obtained which is somewhat brittle at room temperature and the acid number is between 35–50.

PREPARATION OF REACTIVE RESIN AZEOTROPICALLY

Since the viscosity of the resin frequently becomes quite high if the esterification is carried to a low acid number, it may be desirable to produce the resin under azeotropic conditions. Accordingly, the esterification is conducted in an organic solvent which dissolves the reactants as well as the resultant resin and which is preferably substantially insoluble in water. Examples of these are: benzene, toluene, xylene, chloroform, carbon tetrachloride, ethylene dichloride, propylene dichloride, ethylene and propylene trichlorides, butylene dichloride and trichloride and also higher boiling solvents such as cresol and methyl cyclohexanone although some of these may tend to darken the resin. The mixture is refluxed in such a manner as to separate the water formed by the esterification. Much lower temperatures are used than are used under the conditions outlined in Examples 19–21. Suitable temperatures range between 90–145° C., for example, for the lower boiling members of the group of solvents set forth above. Obviously, this will vary with different solvents and with different concentrations of solvent. The range of preferred concentrations for the inert solvent is from about 25% to about 50%. An esterification catalyst is usually necessary because a comparatively low temperature is employed. Examples of these are thymol sulfonic acid, d-camphor sulfonic acid, naphthalene sulfonic acid and p-toluene sulfonic acid. Obviously other known esterification catalysts could be used. A resin having any particular acid number if made azeotropically will usually have a lower viscosity than one of the corresponding acid number not made azeotropically.

PREPARATION OF RESIN "D"

98 parts of maleic anhydride, (vacuum distilled), 106 parts of diethylene glycol (vacuum distilled), about 175 parts ethylene dichloride and about 3 parts d-camphor sulfonic acid were mixed in a reaction chamber. The heating was conducted in an oil bath maintained at 130°–145° C. for nine hours. The distillation temperature began at about 90° C. but gradually rose during the heating. The apparatus was so arranged that the water would be separated from the reflux. A light yellow resin with an acid number of about 19.8 was produced after driving off the volatile ingredients including the ethylene dichloride.

Similar results were obtained using thymol sulfonic acid and approximately the same proportions except that only about 148 parts of ethylene dichloride were used. A resin of acid number 11.3 was obtained.

The resins prepared in the manner illustrated above are merely exemplary of the reactive resins which I contemplate using for reaction with a material containing the CH$_2$=C< group in the practice of my invention. Other resins of the same type may be prepared in a similar manner.

Among these resins the following may be employed in place of part or all of those mentioned above: ethylene glycol fumarate, diethylene glycol fumarate, alpha propylene glycol maleate, polyethylene glycol maleates (e. g., hexaethylene glycol maleate), polymethylene glycol maleates (e. g., decamethylene glycol maleate), octadecandiol fumarate, the maleic esters: of 2,2-dimethyl propenediol-1,3, or 1,3-butanediol, of 1,2-propanediol and of 2-ethyl, 2 butyl butanediol-1,3, glycerol maleate undecylenate, triethylene glycol chlormaleate, triethylene glycol terpene maleate (derived from the interaction of ½ mol of terpene and 1 mol of maleic in the presence of excess of terpene).

When a resin is treated with a reactive material containing the CH$_2$=C< group, the material may or may not dissolve the resin depending on the chemical nature of both the material and the resin. If the resin be incompatible with this reactive material, chemical interaction of the type described cannot occur in that compatibility has not been establshed. Under these conditions another solvent may then be introduced as an additional constituent. If the solvent is inert, it plays no part in the reaction but is so selected that both the reactive material and the resin are soluble yielding a homogeneous system of reactive material, inert solvent and resin. This invention relates to compatible combinations of a reactive resin and a reactive material containing the $CH_2=C<$ group. Such combinations may be obtained by the use of inert blending solvents where necessary although the use of only reactive materials containing the $CH_2=C<$ group which act as solvents is preferred.

The terms compatible and homogeneous as used in the specification and claims are intended to indicate a system, the constituents of which are uniformly distributed throughout the whole mass, and when applied to solutions, to indicate that these may be either true solutions or colloidal solutions as long as they are substantially stable.

When a reactive resin and a reactive material containing the $CH_2=C<$ group undergo chemical reaction, certain possibilities arise. The reactive resin and reactive material may combine in such a manner as to lead to the formation of a resinous colloidal entity and the end-product is clear, glass-like and homogeneous. Alternatively, the reactive resin and the reactive material may interact in such a manner as to yield colloidal entities wherein varying degrees of opacity or colloidal colors result. The end-product under these conditions may be partially translucent or opaque.

The final resin composition is obtained by dissolving a resin containing the alpha, beta enal

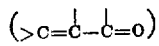

groups in a reactive material containing the group $>C=CH_2$. The chemical reaction which is believed to take place is that the reactive material combines with the resin at the points of unsaturation yielding a less unsaturated system which is essentially insoluble and infusible. Ordinarily when a resin is dissolved in a solvent, the changes which occur are physical in nature. The resin may be isolated from the solvent mixture chemically unchanged. In the present invention, however, the combination of the reactive material containing the $CH_2=C<$ group which acts as the solvent and reactive resin becomes an inseparable entity, the original ingredients not being removed by the solvents for the original ingredients.

Through the use of a small amount of reactive alkyd resin dissolved in a large amount of reactive material containing the $CH_2=C<$ group, the final composition contains not only the ester groupings which were originally present in the alkyd resin but also the carbon-to-carbon molecular bonds which link the reactive material and the reactive resin. Through the use of a small amount of resin and a large amount of reactive material, the composite resin is no longer soluble in those inert solvents wherein the reactive material resinified alone would dissolve. Under long exposure to the inert solvent, the composite resin will tend to imbibe a certain quantity of inert solvent but it does not possess the solubility of the reactive material when resinified alone. This property is a distinct advantage in that the physical contour of an object made of the polymerized resin is not lost through solution.

Comparison of the softening point of the reactive material containing the $CH_2=C<$ group alone and of the softening point of the composite resin formed through interaction of the resin and reactive material shows that the softening point of the latter has been raised. The softening point may be increased very markedly depending upon the ratio of resin used in the composition.

In general the softening point of resins has a distinct bearing on their behavior at room temperature as well as at elevated temperatures. Where the softening point is too low, difficulty is encountered in that articles made from the resin slowly lose their shape. In large articles the effect becomes very noticeable. A softening point when too high, on the other hand, results in a composition which will not soften sufficiently in a mold. Roughly three types of compositions exist with respect to the ratio of resin to reactive material containing the $CH_2=C<$ group. First, a large amount of reactive material and a small amount of resin; second, substantial quantities of both ingredients; and third, a large amount of resin and a small amount of reactive material. The second composition when fully cured possesses no softening point. The first and third varieties of composition when cured may, under high temperatures and pressure, be made to flow slightly.

The composition obtained from substantial quantities of both reactive material containing the $CH_2=C<$ group and reactive resin in the cured state may be machined, turned on a lathe, sanded and polished and used in general as a turnery composition. The absence of softening renders the material particularly adaptable to this purpose. In that it is unflowable, it may be machined without danger of softening and gumming tools. Moreover, such a composition may, if desired, be obtained in large blocks.

My resins may be utilized in: moldings, with or without filler; laminated materials as the bonding agent; adhesives; coating compositions for use in finishes for wood, metals or plastics, or in the treatment of fibrous materials such as paper, cloth or leather; as impregnating agents for fibrous materials; as assistants in dyeing, etc.

In order to use the composition for molding, it may be necessary to prevent the composition from curing too fast. During the change from a liquid to a hard resin, varying stages of hardness exist and by interrupting the reaction at a definite point, the material may then be placed in a form and hardened under heat. Sheets of resin may be twisted, or made to conform to a pattern, and then subsequently cured in the shaped form by heat alone.

One manner in which this may be accomplished is to polymerize the reactive resin and reactive material containing the $CH_2=C<$ group without catalysts until the material is no longer fluid but still not completely cured. By grinding this partially polymerized material a molding composition is obtained which can then be shaped under heat and pressure.

*Example 28*

A mixture of about 40 parts by weight of diallyl phthalate and about 60 parts by weight of ethylene glycol maleate resin (acid number 18) was mixed with 0.2% benzoyl peroxide. This would ordinarily gel in five to six minutes at 90° C. The mixture was prewarmed for two minutes at 90° C. and poured into the mold, the pressure raised to 2000 pounds for about two minutes and then lowered to 1000 pounds. The mold was opened after eight minutes to yield a clear hard disk.

Example 29

A mixture of equal parts by weight of butylene glycol fumarate, (prepared by heating molar quantities of butylene glycol and fumaric acid at about 175° C. until the resin has an acid number of about 50) and diallyl phthalate is treated with 0.5% of benzoyl peroxide and poured into a mold, the sides of which are two sheets of plate glass spaced ⅛ inch apart. The assembly is heated for about ½ hour at 100° C. Under these conditions, a flexible sheet is formed.

The sheet may be distorted and bent into various forms. By further curing in the bent form the resin hardens and assumes the form imposed.

One procedure is as follows: A mandrel was lightly covered with glycerol, the flexible sheet is bent over the mandrel and the resin is covered with glycerol. A thin sheet of metal is then superimposed on the assembly and secured mechanically. The entire mass is heated in an oven for 1 hour at 150° C. A hardened shaped mass results.

The glycerol is used to maintain the original clear surface. It is particularly useful where one surface is glass since the cured resin may adhere very tenaciously to glass.

All types of simple curves can readily be fashioned. Compound curves are more difficult to produce since the resin in the semi-cured stage may be distensible to only a limited extent.

To produce moldings or laminated materials combinations of reactive resin and reactive material containing the $CH_2=C<$ group may be mixed with one or more of the various fillers, e. g., wood flour, wood fiber, paper dust, clay, diatomaceous earths, zein, glass wool, mica, granite dust, silk flock, cotton flock, steel wool, silicon carbide, paper, cloth of any fiber including glass, sand, silica flour, white, black or colored pigments, etc. Such mixtures may be partially polymerized, ground and molded. On the other hand, the liquid composition may be bodied and introduced directly into a mold and polymerization from a viscous liquid to a solid resin conducted in one step.

In that the composition of reactive resin and reactive material is initially quite limpid, it may be used for impregnating various porous objects or employed as a coating composition.

If the polymerizable compositions are to be molded under low pressure (e. g., 0.-50 pounds/sq. in.) the composition may be employed without bodying or partial polymerization.

The liquid polymerizable mixture may be introduced in a positive mold without any filler. In this instance, however, the reaction becomes quite exothermic but this may be conveniently controlled by the addition of a suitable polymerization inhibitor.

The ratio of reactive material containing the $CH_2=C<$ group to reactive resin in the final composition will not only have a bearing on the softening point and on methods of working the resin but on various other physical properties, e. g., light transmission, scratch resistance, indentation hardness and arc resistance. By a judicious selection of the ratio of reactive material to reactive resin a composition best suited to these varying needs of industry may be fabricated.

The methods by which the reactive material containing the $CH_2=C<$ group may be made to combine are various. Heat, light or catalysts may be used or combinations of these, or a combination of heat and pressure. Any suitable method of heating may be used including the application of high frequency electric fields to induce heat in the reactive mixture to polymerize the latter.

During the transformation of the soft, limpid resinous composition to a hard massive structure, various stages occur which may be roughly separated as follows: first, the induction period wherein the material remains as a sol which slowly increases in viscosity; secondly, the transformation of the sol into a gel; and third, the hardening of the gel. During the transformation of the sol to a gel, an exothermic reaction occurs which may be very violent if uncontrolled. Moreover, the gel has relatively poor heat conductivity resulting in heat being transferred poorly through the mass, not only external heat but the heat that is generated during chemical reaction. Cognizance has to be taken of these features in the hardening of the composition, particularly in the casting or molding of large blocks.

Light when used alone causes a relatively long induction period and during the transformation of the sol to the gel requires cooling to overcome the exothermic reaction especially when a powerful source of light is used for final curing. Using heat alone, gelation occurs readily enough at appropriate temperatures but since the gel, when formed, has poor heat conductivity, fracturing may occur in the last stage. Through the use of heat and catalyst, the reaction may become very violent unless the heating is carefully controlled.

Various combinations of these three factors may be used to bring about hardening of the mass. Mild heating of the reactive resin and reactive material containing the $CH_2=C<$ group with or without inhibitors brings about a very gradual increase in viscosity which may be controlled quite easily and readily. When the solution has taken on an appropriate consistency, then accelerators may be introduced and heating conducted at a very much lower temperature. Mild heating may first be used and the mass then exposed to light. Use of superoxides and light is very effective. In other words, through the use of initial heating or bodying, the invention time may be decreased markedly.

While I have specifically described the reaction of mixtures of a reactive resin and a reactive material containing the $CH_2=C<$ group in the liquid state I am not precluded from reacting the reactive material in the vapor state with the resin. Compositions containing a reactive resin and a reactive material containing the $CH_2=C<$ group are originally liquid compositions and by proper treatment at relatively low temperature they can be converted into hard masses. The wide divergence of the properties of such compositions enables them to be used in a variety of different ways. In the liquid form they may be used as an adhesive, impregnating agent or as a surface coating. In that the hardening does not depend upon evaporation, the liquid may be applied to the surfaces desired with the reactive resin mixed with the reactive material containing the $CH_2=C<$ group which acts as the solvent and combining in situ to form a homogeneous adhesive. Such an adhesive can be used for bringing diverse substances together, wood, metal, glass, rubber, or other resinous compositions such as phenolic or urea condensation products. As a surface composition in the liquid form, softening agents, cellulose ethers or esters could be added as well as natural or artificial resins, and the hardening brought about through catalysts such as cobalt salts, oxygen liberating substances or hardening could be accomplished with light. Since these compositions dry from the bottom rather than from the top, the latter frequently remains tacky for a relatively lengthy period. In order to overcome this, drying oil fatty acids, e. g., linseed oil fatty acids are added to the esterification mixture in making the original reactive resin and this will cause the top surface to dry quickly upon subsequent polymerization with a reactive material containing the $CH_2=C<$ group. In this way a coating composition is obtained which dries both from top and bottom.

The liquid resinous composition, moreover, may be cast or molded and after hardening may be isolated as a finished product, or could be cut, turned and polished into the desired finished product. Provided the surface of the mold is highly polished, the resinous substance would acquire a clear, smooth finish from the mold. The compositions so obtained being insoluble are not easily attacked by solvents and being infusible may be worked with ordinary wood working or metal tools. The artificial mass can be cut, turned on a lathe, polished and sanded without superficial softening and streaking.

Obviously natural resins or other synthetic resins may be admixed with the resins of this invention in order to obtain products suitable for particular purposes. Examples of these are shellac, cellulose esters and ethers, urea resins, phenolic resins, alkyd resins, ester gum, etc. The resins of my invention may also be mixed with rubber or synthetic rubber-like products if desired.

In that many of these resins are originally transparent and free of color, they may be colored with suitable dyes to a wide variety of transparent soft pastel shades. An example of a suitable dye is Sudan IV. Darker shades may be obtained, if desired, e. g., with nigrosine.

It may be desirable in some instances to form a copolymer of one or more substances containing the group $CH_2=C<$ and at least one polymerizable unsaturated alkyd resin and, after molding or casting this into any desired shape, to apply a coating of a harder copolymer to the outside, thus obtaining the same effect as is obtained in the metallurgical fields by case hardening. Similarly, inserts may be filled with a hard resin in order to act as bearing surfaces or for some other purpose. Such coatings or inserts adhere tenaciously and appear to become integral with the original piece. In order to secure the best results in manufacturing such products, it is desirable to first abrade the surface of the article before the application of the harder film. During the curing operation, the abrasion marks disappear. This treatment is also of considerable importance since it may also be used to refinish articles which might have been marred in use.

Many of the advantageous properties of the resin resulting from the polymerization of mixtures containing reactive materials containing the $CH_2=C<$ group and reactive resins are apparent from the foregoing disclosure. Several important advantages are now to be set forth.

In molding and casting operations curing takes place either in the presence or absence of air very rapidly. This is of great importance in curing large blocks. Other alkyd resins require a very much longer time to cure in large blocks, i. e., many months, whereas the composition of a reactive resin and reactive materials containing the $CH_2=C<$ group require only a few days, at the most.

Another important advantage is the fact that the reactive material containing the $CH_2=C<$ group which acts as the solvent combines with the resin leaving no residual solvent and giving no problems as to solvent removal.

One of the outstanding advantages of these resins is quick curing time which renders them available for injection molding, blow molding, and extrusion molding.

Castings which are polymers of such substances as methyl methacrylate, for example, frequently contain bubbles which are formed in the lower part of the casting. Inasmuch as the present invention is directed to systems wherein the polymerization proceeds from the bottom to the top, no bubbles are trapped in the casting.

Similar advantages are present in coating operations such as the lack of shrinkage of the film due to loss of solvent because of the combination between the reactive resin and the reactive material containing the $CH_2=C<$ group which acts as the solvent. Furthermore, the composition dries from the bottom, there are no bubbles from the solvent and there is no water driven off. A clear bubble-free, impervious coating is, therefore, more readily obtainable with the combinations of a reactive resin and reactive material containing the $CH_2=C<$ group than with other coating compositions. Since there is no solvent to be removed and since air is not needed to dry the compositions, relatively thick layers may be applied in one operation.

This application is a continuation-in-part of my copending applications Serial Nos. 248,536, filed December 30, 1938 now abandoned, 349,240, filed August 1, 1940 now abandoned, and 487,034, filed May 14, 1943.

Obviously many other reactants and modifications may be used in the processes outlined in this specification without departing from the spirit and scope of the invention as defined in the claims.

I claim:

1. A polymerizable composition comprising (1) an unsaturated alkyd resin (2) a compatible polyallyl ester of a saturated aliphatic polycarboxylic acid and (3) a catalyst for accelerating the copolymerization of (1) and (2).

2. A polymerizable composition, including (1) an unsaturated alkyd resin (2) diallyl succinate, and (3) a catalyst for accelerating the copolymerization of (1) and (2).

3. A polymerizable composition, including (1) an unsaturated alkyd resin (2) triallyl tricarballylate, and (3) a catalyst for accelerating the copolymerization of (1) and (2).

4. A polymerizable composition, including (1) an unsaturated alkyd resin (2) diallyl sebacate, and (3) a catalyst for accelerating the copolymerization of (1) and (2).

5. A composition comprising the product of polymerization of a polymerizable mixture of copolymerizable, compatible materials including (1) an unsaturated alkyd resin obtained by reaction of ingredients comprising a dihydric alcohol and an alpha unsaturated alpha beta dicarboxylic acid and (2) a polyallyl ester of a saturated aliphatic polycarboxylic acid.

6. A synthetic, polymerized composition consisting of an interpolymer of diallyl succinate and an unsaturated alkyd resin.

7. The insoluble and infusible product of polymerization of a mixture of compatible, copolymerizable materials consisting of (1) a polymerizable unsaturated alkyd resin and (2) a diallyl ester of a saturated aliphatic dicarboxylic acid.

8. The product of polymerization of a mixture of compatible, copolymerizable materials consisting of a fumaric ester of a polyhydric alcohol and a polyallyl ester of a saturated aliphatic polycarboxylic acid.

9. The product of polymerization of a mixture of compatible, copolymerizable materials consisting of a maleic ester of a polyhydric alcohol and a polyallyl ester of a saturated aliphatic polycarboxylic acid.

10. A composition comprising the product of polymerization of a polymerizable mixture including triallyl tricarballylate and an unsaturated alkyd resin, said materials being copolymerizable and compatible.

11. A composition comprising the product of polymerization of a polymerizable mixture of copolymerizable, compatible materials including (1) an unsaturated alkyd resin obtained by reaction of ingredients comprising a dihydric alcohol and an alpha unsaturated alpha beta dicarboxylic acid and (2) triallyl tricarballylate.

12. A composition comprising the product of polymerization of a polymerizable mixture including a maleic diester of a dihydric alcohol and triallyl tricarballylate.

13. As a new product, a resinous interpolymer obtained by interpolymerization of a mixture of copolymerizable materials consisting of triallyl tricarballylate and an unsaturated alkyd resin which is a polyester of a mixture including α, β unsaturated dicarboxylic acid and a dihydric alcohol.

14. The method of producing new synthetic compositions which comprises polymerizing a polymerizable composition comprising (1) triallyl tricarballylate, (2) a polymerizable unsaturated alkyd resin compatible with the component of (1), and (3) a catalyst for accelerating the copolymerization of the materials of (1) and (2).

15. A composition comprising the product of polymerization of a polymerizable mixture including a fumaric diester of a dihydric alcohol and triallyl tricarballylate.

16. As a new product, a resinous interpolymer obtained by interpolymerization of a mixture of copolymerizable materials consisting of diethylene glycol maleate and triallyl tricarballylate.

17. A heat-hardenable molding composition comprising (1) a filler and (2) a polymerizable composition comprising (a) triallyl tricarballylate, (b) a polymerizable unsaturated alkyd resin compatible with the component of (a) and obtained by reaction of ingredients comprising a dihydric alcohol and an alpha unsaturated alpha beta dicarboxylic acid, and (c) a catalyst for accelerating the copolymerization of the materials of (a) and (b).

18. A product obtained by the polymerization of a mixture of compatible copolymerizable materials comprising (1) a polymerizable unsaturated alkyd resin and (2) a polyallyl ester of a saturated aliphatic polycarboxylic acid.

19. A polymerizable composition comprising triallyl tricarballylate and a compatible polymerizable unsaturated alkyd resin.

20. A polymerizable composition comprising (1) an unsaturated alkyd resin and (2) a compatible polyallyl ester of a saturated aliphatic polycarboxylic acid.

EDWARD L. KROPA.

REFERENCES CITED

The following references are of record in the file of this patent:

UNITED STATES PATENTS

| Number | Name | Date |
|---|---|---|
| 1,921,756 | Kienle | Aug. 8, 1934 |
| 2,005,414 | Dykstra | June 18, 1935 |
| 2,155,590 | Garvey | Apr. 25, 1939 |
| 2,195,362 | Ellis | Mar. 26, 1940 |
| 2,202,846 | Garvey | June 4, 1940 |
| 2,255,313 | Ellis | Sept. 9, 1941 |

Certificate of Correction

Patent No. 2,443,737.　　　　　　　　　　　　　　　　　　　　　　　June 22, 1948.

EDWARD L. KROPA

It is hereby certified that errors appear in the printed specification of the above numbered patent requiring correction as follows:

Column 4, line 15, extreme right-hand portion thereof for "CH²" read $CH_2$; column 7, line 39, for "perioxide" read *peroxide*; column 18, line 74, for "establshed" read *established*; column 22, line 48, for the word "invention" read *induction*;

and that the said Letters Patent should be read with these corrections therein that the same may conform to the record of the case in the Patent Office.

Signed and sealed this 8th day of February, A. D. 1949.

[SEAL]

THOMAS F. MURPHY,
*Assistant Commissioner of Patents.*